April 23, 1957 C. E. BRANICK Re. 24,307

BUMPER JACK

Original Filed July 31, 1952

INVENTOR.
CHARLES E. BRANICK
BY
Merchant & Merchant
ATTORNEYS

United States Patent Office

Re. 24,307
Reissued Apr. 23, 1957

24,307

BUMPER JACK

Charles E. Branick, Fargo, N. Dak.

Original No. 2,669,424, dated February 16, 1954, Serial No. 301,825, July 31, 1952. Application for reissue April 20, 1955, Serial No. 502,759

12 Claims. (Cl. 254—93)

Matter enclosed in heavy brackets [ ] appears in the original patent but forms no part of this reissue specification; matter printed in italics indicates the additions made by reissue.

My invention relates to portable fluid pressure lifting jacks, and more particularly to bumper jacks for lifting automotive vehicles, and is in the nature of an improvement upon the structure disclosed and broadly claimed in my co-pending application filed December 13, 1951, S. N. 261,499, entitled "Bumper Jack."

The primary object of my invention is the provision of a safety device for bumper jacks of the class above described, and provides an effective mechanism for positively *and automatically* locking the lifting mechanism against accidental lowering movements from a pre-determined height.

A still further object of my invention is the provision of a device of the class immediately above described which is inexpensive to construct, durable in use, and simple and positive in its operation.

The above and still further objects of my invention will become apparent from the following detailed specification, appended claims and attached drawings.

Referring to the drawings wherein like characters indicate like parts throughout the several views.

Figure 1:
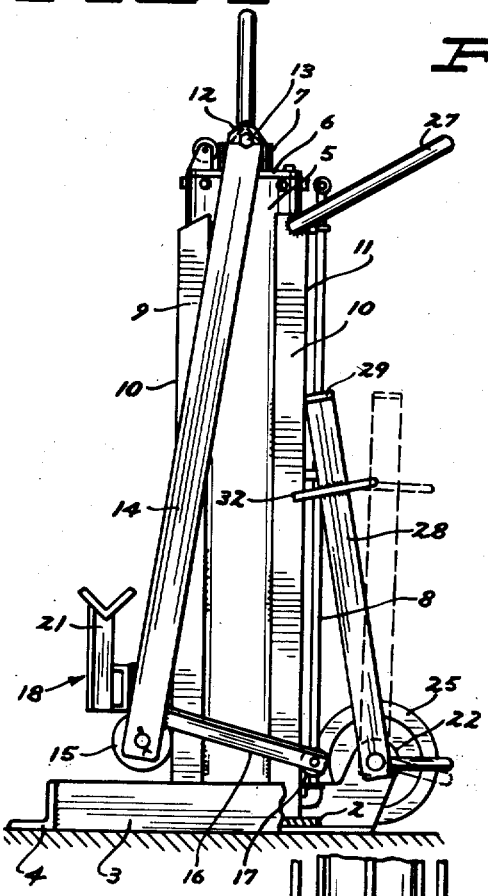
Fig. 1 is a view in side elevation of my novel structure.

Referring with greater particularity to the drawings, the numeral 1 indicates in its entirety a mounting base including a horizontally disposed mounting plate 2, elongated flanges 3 on opposite sides of said mounting plate 2, and an angular cross-member 4 at the forward end of said base plate 2. Numerals 2, 3, and 4 are preferably formed from steel and are welded together into a rigid unit. Projecting upwardly from the central portion of the base plate 2 is a cylinder 5, formed from steel or the like and having a head 6 at its upper end through which slidably projects a piston or plunger rod 7 secured to a piston, not shown within the cylinder 5. Fluid under pressure is introduced into the lower end of cylinder 5 through the conduit 8, all as more clearly set forth in my above identified co-pending application.

A pair of elongated rails 9 are rigidly secured to opposite side portions of cylinder 5 and project forwardly thereof so as to provide rails 10 which are parallel to each other and to the axis of the cylinder 5. A pair of laterally spaced rails 10, similar in all respects to the rails 9, are rigidly secured to opposite side portions of the cylinder 5 and project rearwardly therefrom to provide rails 11 parallel to each other and to the axis of the cylinder 5. Rigidly secured to the extreme end of the plunger rod 7 is a cross-head 12 the opposite ends of which terminate in a vertical plane intermediate the rails 9 and 10. Rigidly secured by headed bolts or the like 13 to opposite ends of the cross-head 12, are a pair of lifting links 14 which depend therefrom angularly forwardly. Rollers 15 are journalled to the free end portions of the lifting links 14 and one each thereof is adapted to work upon one of the track surfaces 10 of the forwardly disposed pair of rails 9. A pair of guide rods 16 are rigidly secured to the lower end portion of said lifting links 14, preferably and as shown above the pivotal connection thereto of the rollers 15. Guide rods 16 project rearwardly at substantially right angles to the lifting links 14 and have rollers 17 pivotally secured to their free ends. Rollers 17 are adapted to work, one each upon a track surface 11 of one of the rearwardly disposed rails 10 upon lowering and raising movements of the lifting links 14.

Rigidly secured to the lower end portions of the lifting links 14 and projecting forwardly and upwardly therefrom is an object engaging member in the nature of a lifting beam identified in its entirety by the numeral 18 and including a tubular intermediate section 19 projecting laterally outwardly from said lifting links 14, and adjustable end sections 20 slidably but non-rotatively mounted in the beam section 19, and each thereof having on its extended end an upstanding head 21. Lifting beam 18 and its operation is more fully explained in my co-pending application, S. N. 298,019, filed July 10, 1952, entitled "Bumper Jack."

At their extreme rear ends the side flanges 3 of the base 1 are provided with upstanding boss elements 22 through which extend a horizontally disposed axle 23. To the extended outer end portions 24 of the axle 23 are journalled wheels 25. As shown, the peripheral portions of the wheels 25 are normally in spaced relationship to the ground, and contact with the ground, in order to transport the structure, is made only by imparting rocking movements to the structure around the rear edge 26. Handle 27 is designed to facilitate this rocking movement. All of the structure described to this point has been described in even greater detail in one or both of my above identified co-pending applications. Lifting movements are imparted to the plunger rod 7, lifting links 14, lifting beam 18, and guide rods 16 by applying fluid under pressure to the conduit 8 through a valve mechanism, not shown, from an air hose conventionally found in filling stations, garages and the like. However, as a safety feature, and in order to positively prevent accidental or undesired lowering movements to be imparted to the lifting links 14 and parts associated therewith, I provide an automatic locking device comprising a pair of locking legs 28 which are pivotally secured at their lower ends to the axle 23 inwardly of the side flanges 3, whereby the free upper ends of said locking legs 28 are mounted for swinging movements toward and away from engagement with intermediate portions of the track surfaces 11 provided by rails 10. At the extreme upper ends the locking legs 28 are provided with enlarged feet 29 which are adapted to engage and stop movement of the rollers 17 on the free ends of guide rods 16. *When the locking legs 28 are in engagement with the track surfaces 11 the enlarged feet 29 are disposed in the path of movement of the rollers 17.* It is to be noted that the vertical plane in which the axle 23 is located rearwardly of the rails 10, whereby the locking legs 28 *are biased and* will retain themselves in engagement with the track surfaces 11 under the action of gravity. The extreme lower end portions of the locking legs 28 are secured together for common movement and for rigidity by means of a U-shaped member 30 which projects rearwardly therefrom, in substantially a horizontal plane when the feet 29 are in engagement with the track surfaces 11, thus providing a rocking arm or treadle for swinging the free upper end of the locking legs 28 outwardly, either during lifting movements of the links 14 and parts associated therewith or during intentional lowering movements of same.

Figure 2:
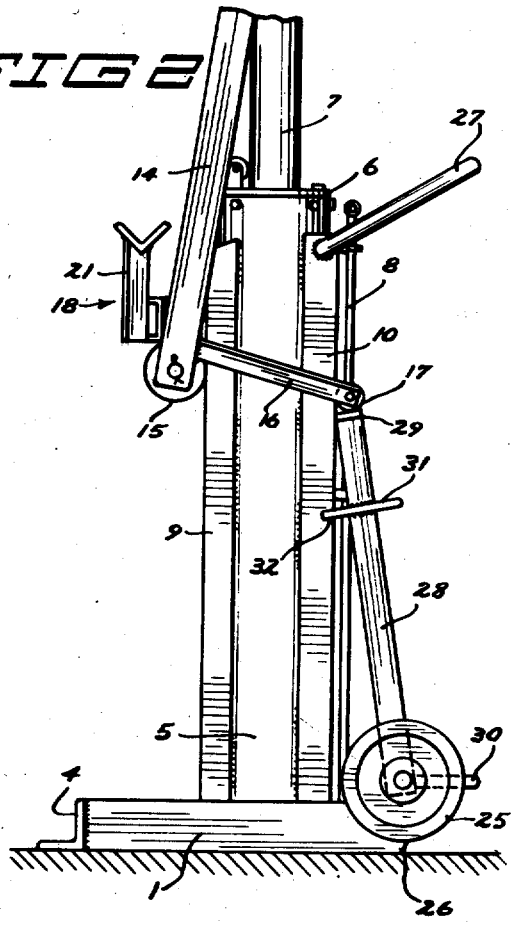
Fig. 2 is a view corresponding to Fig. 1 but showing a different position of some of the parts.
Figure 3:
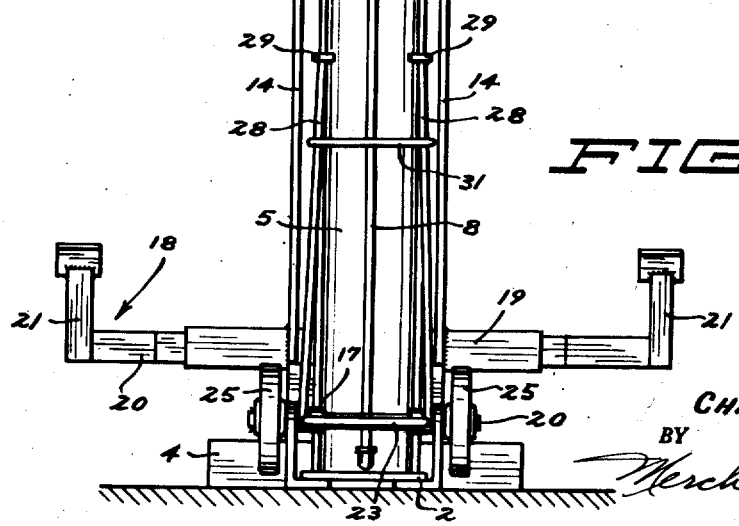
Fig. 3 is a fragmentary view in front elevation of the structure of Fig. 1.

The upper end portions of the locking legs 28 are likewise bound together by means of a U-shaped member 31, the intermediate portion of which projects forwardly from the legs 28 and provides a handle, therefor, if desired; and the rear portions are in the nature of fingers 32, one each of which engages the outer surface of an opposite one of the rails 10 when locking legs 28 are in the operative locking position of Fig. 2. Fingers 32, therefore, positively preclude lateral shifting movements of the locking legs 28 and thus prevent unseating of the rollers 17 with respect to the feet 29.

From the above it should be obvious that when it is desired to impart lifting movements to the lifting links 14 and parts associated therewith, fluid under pressure is introduced into the cylinder 5 by means of an air hose remote from said cylinder, through conduit 8. During lifting movements, *the rollers 17 engage the enlarged feet 29 and move* the locking legs 28 [are swung] to the dotted line position of Fig. 1. When the guide rods 16 and rollers 17 carried thereby are elevated to a height above the level of the feet 29 on the locking legs 28, the locking legs 28 are caused to assume the full line position of Fig. 1 *by the biasing effect of gravity, described above.* Thereafter, in the event of failure of the line 8 or valves associated therewith, or for other structural reasons undesired lowering movements are caused to be imparted to said lifting links 14 and parts associated therewith, such lowering movements will be checked by engagement of the rollers 17 with the feet 29, as shown in Fig. 2.

While I have shown and described a commercial embodiment of my invention, it should be obvious that same is capable of modification without departure from the scope and spirit of the invention as defined in the appended claims.

What I claim is:

1. In a portable fluid pressure jack, a mounting base defining an elongated vertically disposed pressure cylinder, pairs of laterally spaced rails on the front and rear sides of said cylinder, said rails providing track surfaces parallel to each other and to the axis of said cylinder, a fluid pressure operated piston within said cylinder, a plunger rod carried by said piston and projecting upwardly through a head on the upper end of said cylinder, a cross-head mounted on the upper end of said plunger rod in a vertical plane intermediate said pairs of rails, a pair of lifting links connected one each to opposite ends of said cross-head and depending angularly forwardly therefrom, rollers journalled to the lower end portions of said lifting links and working one each on one of the track surfaces of the forwardly disposed rails, a pair of guide rods connected one each to the lower portions of said lifting links and projecting rearwardly therefrom, a roller journalled to each of the free ends of said guide rods and [a] working one each on one of the track surfaces of the rearwardly disposed rails, a forwardly projecting bumper engaging member secured to the lower ends of said lifting links, a pair of locking legs pivotally secured to the rear portion of said base for swinging movements of their free ends toward and away from engagement each with the intermediate portion of one of said rearwardly disposed track surfaces, the upper end of said locking legs being provided with enlarged feet which engage the rollers on the free ends of said guide rods during downward movements of said lifting links *when said locking legs* [when said links] have been positioned in contact with said track surfaces after said [roller] *rollers* have been elevated upwardly thereof, and forwardly projecting fingers on the upper portions of each of said locking legs below said enlarged feet, each of said fingers engaging the outer surface of one of said rearwardly disposed rails when said feet are in engagement with said track surfaces whereby to restrain said locking legs against lateral movements when same are in operative locking positions.

2. In a portable fluid pressure jack, a mounting base defining an elongated vertically disposed pressure cylinder, pairs of laterally spaced rails on the front and rear sides of said cylinder, said rails providing track surfaces parallel to each other and to the axis of said cylinder, a fluid pressure operated piston within said cylinder, a plunger rod carried by said piston and projecting upwardly through a head on the upper end of said cylinder, a cross-head mounted on the upper end of said plunger rod in a vertical plane intermediate said pairs of rails, a pair of lifting links connected one each to opposite ends of said cross-head and depending angularly forwardly therefrom, rollers journalled to the lower end portions of said lifting links and working one each on one of the track surfaces of the forwardly disposed rails, a pair of guide rods connected one each to the lower portions of said lifting links and projecting rearwardly therefrom, a roller journalled to each of the free ends of said guide rods and working one each on one of the track surfaces of the rearwardly disposed rails, a forwardly projecting bumper engaging member secured to the lower ends of said lifting links, a locking leg pivotally secured to the rear portion of said base for swinging movements of its free end toward and away from engagement with the intermediate portion of one of said rearwardly disposed track surfaces, the extreme upper end of said locking leg engaging the roller on the free end of one of said guide rods during downward movements of said lifting links [and] when said locking leg has been positioned in contact with said track surface[s] after said roller has been elevated upwardly thereof, and means on the upper end of said locking leg *engageable with one of said rails* [engageable with said rail] for restraining said locking leg against lateral movements when same is in operative position.

3. In a portable fluid pressure jack structure comprising a base, a pressure cylinder mounted on said base, a piston in said cylinder, a plunger rod secured to said piston and projecting through a head on said cylinder, guide means at opposite sides of the axis of said cylinder, a cross-head rigidly connected to the outer projecting portion of said plunger, a load lifting structure including a bracket connected to said cross-head and extending outwardly from one side of said cylinder, anti-friction means intermediate said load lifting structure and said guides adjacent said load lifting bracket and an automatic locking means pivotally secured to said jack for swinging movements of its free end to and from the vertical, said locking means in one position having its free end in contact with a portion of the jack above said base and disposed in the path of said load lifting structure, said load lifting structure in its upward movement engaging said locking means in said one position and said locking means being biased for automatic engagement under a portion of said load lifting structure preventing said structure from returning to its lower position.

4. The structure defined in claim 3 wherein said base includes a base plate and upstanding brackets on opposite sides of said base plate, and in further combination with a horizontally disposed axle extending transversely through said brackets rearwardly of said guides, and a wheel on each opposite end of said axle outwardly of said flanges and base plate, said locking means being pivotally secured to said axle.

5. The structure defined in claim 3, wherein said locking means comprises a pair of laterally spaced locking leg elements, one each engageable with opposite sides of said jack [portion, the] *structure, the* free ends of said legs being provided with enlarged feet which engage said under portion of said load lifting structure and means securing the upper and lower portions of said locking leg portions together, said lower means comprising a U-shaped treadle projecting rearwardly of said base, and said upper means comprising a U-shaped member the looped end thereof projecting rearwardly of said legs and providing a handle.

6. The structure defined in claim 3, wherein said locking means has a restraining means retaining said locking means against lateral movements in relation to said load lifting structure when said locking means is in operative position.

7. The structure defined in claim 6, wherein said restraining means comprises forwardly projecting fingers on the upper portion of said locking means, each of said fingers engaging one of said guides when said locking means is in engagement with said under portion of said load lifting structure thereby restraining said locking means against said lateral movement.

*8. In a portable fluid pressure jack comprising a base, a pressure cylinder structure, a plunger-equipped piston structure in said cylinder structure, means mounting one of said structures on said base and providing vertical movement for the other structure in relation thereto, said vertically movable structure including a load lifting means, and an automatic locking means pivotally secured to said jack for swinging movements of a free end portion thereof to and from the vertical, said locking means in one position having the free end portion in contact with a portion of the jack above said base and disposed in the path of said vertically movable structure, said vertically movable structure in the upward movement engaging an upper portion of the locking means in said one position and said locking means being biased for automatic engagement under a portion of said vertically movable structure preventing said vertically movable structure from returning to a lower position.*

*9. The portable fluid pressure jack defined in claim 8 wherein said base includes a base plate and upstanding transversely spaced brackets, and in further combination with a horizontally disposed axle extending transversely through said brackets, wheel means on each opposite end of said axle and said locking means being pivotally secured to said axle.*

*10. The portable fluid pressure jack defined in claim 8 wherein said locking means comprises a pair of laterally spaced pivotally mounted locking leg elements, one each*

*engageable with opposite sides of said jack, the free end portions of said legs being provided with enlarged feet which engage said under portion of said vertically movable structure and upper and lower means securing the upper and lower portions of said locking leg elements together, said lower means comprising a U-shaped treadle projecting rearwardly of said base, and said upper means comprising a U-shaped member the looped portion thereof projecting rearwardly of said leg elements and providing a handle for said locking means.*

*11. The portable fluid pressure jack defined in claim 8, wherein said locking means has a restraining means retaining said locking means against lateral movement in relation to said vertically movable structure when said locking means is in said one position.*

*12. The portable fluid pressure jack defined in claim 11, wherein said restraining means comprises forwardly projecting fingers on the upper portion of said locking means each of said fingers engaging portions of said means mounting one of said structures on said base when said locking means is in engagement with said under portion of the vertically movable structure thereby restraining said locking means against said lateral movement.*

References Cited in the file of this patent
or the original patent

| | | |
|---|---|---|
| 1,248,861 | Holloway | Dec. 4, 1917 |
| 1,344,037 | Heymann | June 22, 1921 |
| 1,447,242 | Fritz | Mar. 6, 1923 |
| 1,481,445 | Swanson | Jan. 22, 1924 |
| 1,512,837 | Evenden | Oct. 21, 1924 |
| 2,050,000 | Frost | Aug. 4, 1936 |
| 2,490,233 | Schildmeier | Dec. 6, 1949 |
| 2,558,535 | Billings | June 26, 1951 |

FOREIGN PATENTS

| | | |
|---|---|---|
| 530,526 | Great Britain | Dec. 13, 1940 |